(12) United States Patent
Moodbidri et al.

(10) Patent No.: US 9,345,052 B2
(45) Date of Patent: May 17, 2016

(54) METHOD AND SYSTEM FOR ALLOWING INCOMING EMERGENCY COMMUNICATIONS ON A DISABLED DEVICE

(71) Applicant: T-Mobile USA, Inc., Bellevue, WA (US)

(72) Inventors: Neeta Moodbidri, Issaquah, WA (US); Nilesh Ranjan, Sammamish, WA (US); Simon Chapman, Issaquah, WA (US); Timothy N. Dunn, Issaquah, WA (US); Jeffrey Hall, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/887,285

(22) Filed: Oct. 19, 2015

(65) Prior Publication Data

US 2016/0044715 A1  Feb. 11, 2016

Related U.S. Application Data

(60) Continuation of application No. 13/646,575, filed on Oct. 5, 2012, now Pat. No. 9,167,605, which is a division of application No. 12/491,183, filed on Jun. 24, 2009, now Pat. No. 8,306,501, which is a (Continued)

(51) Int. Cl.
*H04W 4/22* (2009.01)
*H04W 76/00* (2009.01)
*H04M 3/51* (2006.01)

(52) U.S. Cl.
CPC .......... *H04W 76/007* (2013.01); *H04M 3/5116* (2013.01); *H04W 4/22* (2013.01); *H04M 2203/6081* (2013.01); *H04M 2242/04* (2013.01)

(58) Field of Classification Search
CPC ... H04W 76/007; H04W 4/22; H04M 3/5116; H04M 2203/6081; H04M 2242/04
See application file for complete search history.

(56) References Cited

U.S. PATENT DOCUMENTS 4,166,929 A * 9/1979 Sheinbein .......... H04Q 3/54533
370/428
5,319,699 A   6/1994 Kerihuel et al.
(Continued)

FOREIGN PATENT DOCUMENTS

KR   20050089363     9/2005
WO   2009061858 A1  5/2009
WO   2010124299 A2  10/2010

OTHER PUBLICATIONS

"BroadVoice Emergency 911 Service: Frequently Asked Questions," BroadVoice.com, http://web.archive.org/web/20060926195218/ http://www.broadvoice.com/support_faqs_911.html, Sep. 26, 2006, 3 pages; office action for U.S. Appl. No. 12/491,183.

(Continued)

*Primary Examiner* — Kashif Siddiqui
(74) *Attorney, Agent, or Firm* — Perkins Coie LLP

(57) ABSTRACT

A system and method to allow a disabled device to receive an incoming communication after the termination of an emergency communication session with a service provider. A disabled device is a device having a portion of its service plan that allows the device to send or receive communications either temporarily or permanently disabled. In some embodiments, the system allows the disabled device to receive all incoming communications during a defined period of time after the emergency communication session. In some embodiments, the system allows the disabled device to receive all incoming communications from numbers or URIs contained in a repository of allowed numbers. In some embodiments, the system allows the disabled device to receive all incoming communications if the service provider initiating the communication enters an authenticated routing key or passcode.

20 Claims, 7 Drawing Sheets

Related U.S. Application Data continuation of application No. 12/265,707, filed on Nov. 5, 2008, now abandoned.

(60) Provisional application No. 60/985,633, filed on Nov. 5, 2007.

(56) References Cited

U.S. PATENT DOCUMENTS

| | | | |
|---|---|---|---|
| 5,379,337 | A | 1/1995 | Castillo et al. |
| 5,467,368 | A | 11/1995 | Takeuchi et al. |
| 5,467,388 | A | 11/1995 | Redd, Jr. et al. |
| 5,864,755 | A | 1/1999 | King et al. |
| 6,070,065 | A | 5/2000 | Armbruster et al. |
| 6,154,532 | A * | 11/2000 | Lockhart ............... H04M 15/06 379/114.02 |
| 6,249,674 | B1 | 6/2001 | Verdonk |
| 6,571,092 | B2 | 5/2003 | Faccin et al. |
| 6,574,324 | B1 * | 6/2003 | Malik ............... H04M 3/42195 379/201.01 |
| 6,718,027 | B1 | 4/2004 | Mailk et al. |
| 6,744,859 | B1 * | 6/2004 | Koepke ............... H04M 3/51 379/265.01 |
| 7,092,695 | B1 | 8/2006 | Boling et al. |
| 7,324,801 | B2 | 1/2008 | Droste et al. |
| 7,436,938 | B2 * | 10/2008 | Savaglio ............ H04M 3/42314 379/37 |
| 7,627,307 | B2 | 12/2009 | Droste et al. |
| 7,848,733 | B2 | 12/2010 | Bull et al. |
| 8,010,079 | B2 | 8/2011 | Mia et al. |
| 8,306,501 | B2 | 11/2012 | Moodbidri et al. |
| 8,682,281 | B2 | 3/2014 | Dunn et al. |
| 9,167,605 | B2 | 10/2015 | Moodbidri et al. |
| 2002/0086659 | A1 | 7/2002 | Lauper |
| 2002/0111159 | A1 | 8/2002 | Faccin et al. |
| 2002/0142753 | A1 | 10/2002 | Pecen et al. |
| 2002/0142805 | A1 | 10/2002 | Pecen et al. |
| 2004/0176066 | A1 | 9/2004 | Binzel et al. |
| 2004/0203565 | A1 * | 10/2004 | Chin ....................... H04W 4/22 455/404.1 |
| 2004/0203572 | A1 * | 10/2004 | Aerrabotu ............... H04W 4/22 455/404.1 |
| 2004/0203576 | A1 * | 10/2004 | Droste ................. H04W 88/02 455/404.1 |
| 2005/0053209 | A1 | 3/2005 | D'Evelyn et al. |
| 2005/0070250 | A1 * | 3/2005 | Scalisi ............ H04M 3/42195 455/411 |
| 2005/0227671 | A1 * | 10/2005 | Stephens ................. H04M 1/64 455/412.1 |
| 2006/0140351 | A1 | 6/2006 | Croak et al. |
| 2006/0172720 | A1 | 8/2006 | Islam et al. |
| 2006/0205383 | A1 * | 9/2006 | Rollender ............... H04W 4/22 455/404.1 |
| 2008/0072030 | A1 | 3/2008 | Karpa et al. |
| 2008/0072037 | A1 | 3/2008 | Narayanan et al. |
| 2008/0200142 | A1 | 8/2008 | Abdel-Kader et al. |
| 2009/0047923 | A1 | 2/2009 | Jain et al. |
| 2009/0110163 | A1 * | 4/2009 | Gupta ................... H04M 15/00 379/114.01 |
| 2010/0029244 | A1 | 2/2010 | Moodbidri et al. |
| 2010/0273445 | A1 | 10/2010 | Dunn et al. |
| 2011/0044436 | A1 * | 2/2011 | Tam ................ H04M 1/274558 379/88.19 |
| 2011/0072499 | A1 * | 3/2011 | Lin ........................ G06F 21/35 726/6 |

OTHER PUBLICATIONS

International Search Report and Written Opinion for PCT/US2008/082535; Applicant: T-Mobile USA, Inc.; Date of Mailing: Jan. 30, 2009, 13 pages.

International Search Report and Written Opinion for PCT/US2010/032460; Applicant: T-Mobile USA, Inc.; Date of Mailing: Dec. 9, 2010, 8 pages.

* cited by examiner

METHOD AND SYSTEM FOR ALLOWING INCOMING EMERGENCY COMMUNICATIONS ON A DISABLED DEVICE

CROSS-REFERENCE TO RELATED APPLICATION

This application is a continuation of U.S. patent application Ser. No. 13/646,575, filed Oct. 5, 2012, which is a divisional application of U.S. patent application Ser. No. 12/491,183 filed Jun. 24, 2009, which is a continuation application of U.S. patent application Ser. No. 12/265,707, filed Nov. 5, 2008, which claims the benefit of U.S. Provisional Application No. 60/985,633, entitled "METHOD AND SYSTEM FOR ALLOWING INCOMING EMERGENCY COMMUNICATIONS ON A DISABLED DEVICE," filed Nov. 5, 2007.

BACKGROUND

Telephone service providers offer their customers a variety of service plans. A customer may select a plan that is billed at a flat rate every month with additional charges added on the following month for services the customer uses beyond their standard plan (e.g. text messages, used minutes beyond the allocated amount in the plan, downloads, or any number of other extra cost services). In these example payment plans, service may be discontinued for a variety of reasons such as a failure to pay the bill, violating the terms of service (TOS), and/or a report that the phone has been lost or stolen. Additionally, some telephone service providers offer pre-paid phone plans as an alternative to the monthly billed (or other) plan. In a pre-paid plan, a customer may purchase a certain number of minutes, or units of time, before using those minutes. The network may keep track of minute-, or unit-, usage at a real-time rate, and prompt the customer to purchase more minutes, or units, when the customer has run out or is near running out of usable calling minutes, or units. For example, a unit of time may correspond to a specific amount of minutes depending upon the intended calling location (e.g., more units are required for international telephone calls as compared to the units required for a domestic call for a same amount of minutes). Service may be discontinued when the customer has exhausted all of the pre-paid minutes or units of time, or, for example, service to specific locations may be unavailable due to insufficient or a low number of pre-paid minutes or units.

Even though a service provider may disable general service to a telecommunications device (e.g., wired phone, cordless phone, mobile telephone, personal digital assistant, smart phone, laptop computer, etc.), the service provider may still allow a user of the disabled device to place an emergency call to pre-approved telephone numbers or URIs (Uniform Resource Identifiers). For example, the service provider may allow an emergency call to be made to emergency services (e.g., 911), to the service provider's customer service number, or to other localized numbers or URIs. An allowed call to emergency services may connect the device to a Public Safety Answering Point (PSAP). The service provider knows which PSAP to route a call to when a user dials for emergency assistance. In a given situation, a caller of 911 or other emergency hotline is routed to a specific emergency call center, commonly referred to as a primary PSAP. The primary PSAP acts to obtain and verify the whereabouts of the caller, determine the nature of the emergency, notify an appropriate response team(s), and/or contact a secondary or other PSAP. In some situations, the primary PSAP may not be responsible for directly dispatching an appropriate response team, and will need to identify and/or contact/conference in a secondary PSAP, e.g., a police dispatcher or a fire team dispatcher.

In some circumstances, a PSAP may need to call back the disabled device that placed the emergency services call. For example, a call between the parties may have been terminated before all desired information had been exchanged. Currently, however, a PSAP is not able to place a call to a disabled device. The inability of the PSAP to contact a disabled device is a significant shortcoming that can impact the ability to offer emergency services in a timely fashion to the device user.

DETAILED DESCRIPTION

Figure 1:
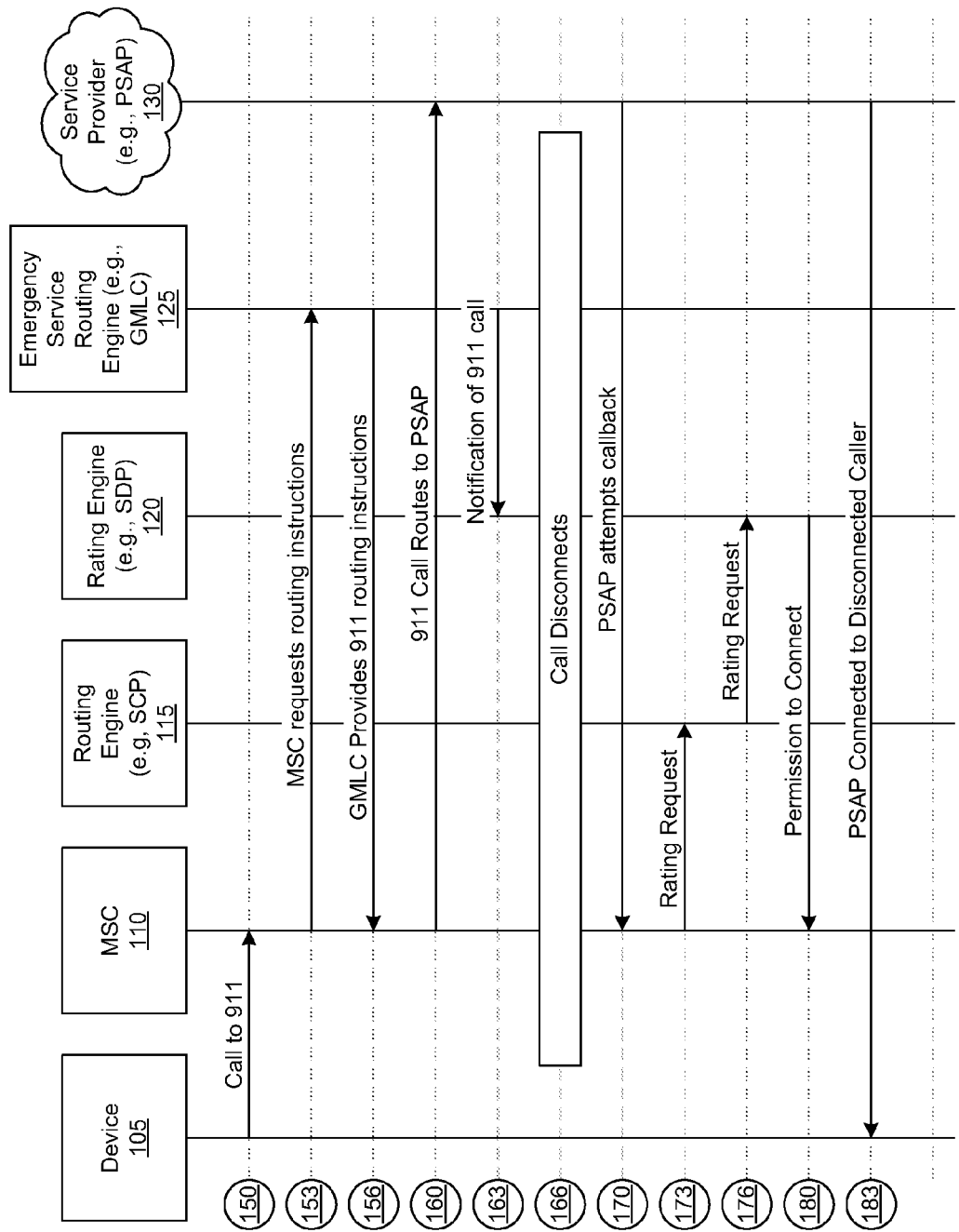
FIG. 1 is a signaling diagram that depicts allowing callbacks to a disabled device based on an elapsed time.

A system and method to allow a disabled device to receive an incoming communication after the termination of an emergency communication session with a service provider is disclosed. A "device" is any telecommunications device (e.g., a wired, wireless, or cordless phone; VoIP device; Unlicensed Mobile Access (UMA) or UMA-enabled device; portable or handheld computer; smartphone; media player; or the like) having a service plan with a telecommunications service provider that allows the device to communicate with others via voice, video, text, etc. A "disabled" device is a device having the portion of its service plan that allows the device to send or receive communications either temporarily or permanently disabled. For example, a device user may have exhausted a usage allowance (e.g., used all of his/her prepaid minutes) or may have had access suspended by an authorized user (e.g., by a parent or guardian that allocates minutes in a shared family plan), thereby resulting in a "service lock" for the device. Various methods are disclosed herein to allow a disabled device to receive communications after an emergency communication session, even though such communications would normally be prevented as a result of the service lock.

In some embodiments, the system activates a timer or other time-measurement technique upon detecting that a device user initiated an emergency communication session (e.g., a voice, video, multimedia, Short Message Service (SMS), and/or Instant Messaging (IM) session), such as by dialing 911. The timer may be activated for a defined period of time (e.g., 10 minutes, 5 minutes, etc.). The system allows the device to receive all incoming communications (e.g., any incoming voice, video, multimedia, Short Message Service (SMS), and/or Instant Messaging (IM) session) during the defined period of time. For example, all incoming calls during the defined time period may be rated as free and/or the service lock may be overridden. Alternatively, in some embodiments, the timer may be activated in response to the emergency communication session having been disconnected or dropped.

In some embodiments, the system may maintain a repository of emergency telephone numbers or URIs (Uniform Resource Identifiers), and all incoming communications from numbers or URIs contained in the repository that occur after a device user has initiated an emergency communication session may be allowed. The repository of telephone numbers or URIs may include all known service providers such as Public Safety Answering Points (PSAPs), telecommunications service providers' customer service numbers, or other desired telephone numbers or URIs. The incoming communication may be allowed by the system by rating the communication as free and/or overriding the service lock.

In some embodiments, in response to a device user's request to initiate an emergency communication with a service provider (e.g., by dialing 911), the communication request may be routed to the service provider and a routing key or passcode may additionally be forwarded to the service provider (e.g., to a PSAP, a PSAP operator, a system repository which may be accessible by a PSAP, and/or the specific PSAP to whom the call was routed). Subsequently, the system prompts anyone seeking to contact the disabled device for the routing key or passcode. The system allows communication with the disabled device if the routing key or passcode entered by the caller matches the routing key or passcode initially generated by the system. The routing key or passcode may be kept secret from the service provider operator or made available to the service provider operator. The system may allow the communication by, for example, rating the communication as free and/or overriding the service lock.

The emergency communication session established with a device may be, for example, a voice, video, multimedia, text, Short Message Service (SMS), and/or IM session. For purposes of clarity, the discussion herein often focuses on establishing a 911 call with a PSAP. The disclosed technology is not limited to use for 911 calls to PSAPs, however, and may be applied to any communication session with one or more service providers.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

As previously described, a device may be placed in a temporary or permanent disabled state for a variety of reasons, such as the exhaustion of a prepaid service plan that covers the device or because a user managing service to the device has elected to restrict access to a service. Even though a device may be in a disabled state, many telecommunications service providers will allow an outgoing emergency communication to be placed from the device, because the service provider is able to identify commonly assigned emergency numbers (such as the sequence 9-1-1) that reflect a user's need to place an emergency communication. Under such circumstances, even if the device is disabled the service provider may allow the communication to proceed. In contrast, it was previously not possible for a PSAP to initiate or otherwise reestablish a communication session with a disabled device, such as may be required if a communication session with the device is terminated. Accordingly, there exists a need to allow PSAPs or other emergency service providers to establish communication with a disabled device.

FIG. 1 is a signaling diagram illustrating a series of messages that are sent between a disabled device 105, a switch (e.g., a Mobile Switching Center or MSC) 110, a routing engine (e.g., an SCP) 115, a rating engine (e.g., an SDP) 120, an emergency service routing engine (e.g., a GMLC) 125 and a service provider 130, in order to establish an emergency communication between the disabled device 105 and the service provider 130, and to reestablish the communication between the same or different service provider and the disabled device 105 if the emergency communication between the disabled device and the service provider is interrupted or otherwise terminated. The service provider 130 may be a Public Safety Answering Point (PSAP), such as a 911 call center, a customer service center, or any other service provider or third party service (e.g., police, fire) that may need to communicate with a device user during an emergency situation. The device 105 may, for example, be a wired, wireless, or cordless phone, VoIP phone, Unlicensed Mobile Access or UMA enabled device, portable computer, handheld computer, smartphone, media player, or the like. The device 105 has been disabled such that it is not authorized to initiate and/or receive communications with other devices, other than to establish communication with certain service providers.

A variety of circumstances may cause a device to be placed in a disabled state where it is prevented from initiating or receiving communication (e.g., from placing or receiving calls). The device 105 may, for example, be a real-time rated device that operates on a real-time rated plan (e.g. a pre-paid plan or family allowance plan). In the example of a pre-paid plan, the device user may have purchased a quantity of minutes or units and used up those minutes or units. Until the user purchases more minutes or units, the device may be disabled except for establishing communication with certain service providers. As another example, the real-time rated plan may be a family allowance plan (e.g., such as the Family Allowances$^{SM}$ plan by T-Mobile). In a family allowance plan, an account supervisor (e.g., a parent or guardian) may purchase an allotment of minutes and/or usage units (e.g., downloads, SMSs, etc.) each time period to be shared among various devices participating in the supervisor's family allowance plan. The supervisor allocates a defined amount of usage (e.g., minutes, text messages, multimedia downloads) to a device. Upon reaching the allocated amount of usage, the device is disabled. Alternatively and/or additionally, the supervisor may selectively limit use of the device by causing the device to be automatically disabled at various times of the day and/or particular days of the week and/or defined locations (e.g., near a school). Further details of a family allowance plan may be found in U.S. application Ser. No. 12/246,439, filed Oct. 6, 2008 and entitled "SYSTEM THAT ENABLES A USER TO ADJUST TELECOMMUNICATIONS RESOURCES ALLOCATED TO A GROUP," which is hereby incorporated by this reference in its entirety. While the device is disabled, it may still be operable to initiate communication with pre-approved numbers. Such pre-approved numbers may be numbers selected and/or approved by the account supervisor, and typically, for example, include 9-1-1.

Various network elements enable communication between the device and the service provider as described herein. The switch 110 is a Mobile Switching Center (MSC) or any other component or platform that is operable to detect an emergency communication request initiated by the device or by the service provider. The routing engine 115 is, for example, an SCP (Service Control Point) or similar component or platform used to control service to the device. The SCP is a standard component of an Intelligent Network (IN) telephone system, which is used to control real-time rated phone services. The rating engine 120 is an SDP (Service Data Point) or any other component or platform that determines whether an emergency communication session may be reestablished between a service provider and the device 105. The SDP may be a node in the service network (e.g., a GSM network) responsible for determining device user information such as, for example, rate plans, rate balance, device identification (e.g., MSISDN), and time an emergency communication session was established and/or disconnected. Further details of the routing engine 115 and the rating engine 120 are described below.

As shown in FIG. 1, to initiate an emergency communication session, at a time 150 a disabled device 105 sends a communication request to the switch 110. Such a request may be, for example, a 911 call. Even though the device is disabled, such a communication is allowed by the system since it is directed to an emergency number. At a time 153, the switch 110 requests a routing instruction, e.g., a Pseudo Automatic Number Identification or pANI (such as an Emergency Services Routing Key (ESRK) or an Emergency Services Query Key (ESQK)) from the emergency service routing engine 125. The emergency service routing engine 125 provides the routing information to the switch 110 to route the communication request. In some embodiments, the emergency service routing engine 125 is a Gateway Mobile Location Center (GMLC) which may interface with one or more other system nodes. At a time 156, the emergency service routing engine 125 forwards the routing instruction(s) to the switch 110. The routing instructions are used to identify the service provider 130 (e.g., a PSAP) where the emergency communication request is to be routed. At a time 160, the switch 110 routes the communication request to the service provider 130 identified via the routing instructions. A communications session is then established between the device 105 and the service provider 130.

At a time 163, the emergency service routing engine 125 notifies the rating engine that the emergency communication session has been established between the device 105 and the service provider 130. In some embodiments, the emergency service rating engine 125 provides the rating engine 120 with a time the emergency communication session was established and with a device identifier (e.g. telephone number, Mobile Subscriber Integrated Services Digital Network Number (MSISDN), an International Mobile Subscriber Identifier or IMSI, a MAC address, an IP address, etc.). The rating engine 120 may then initiate a timer based on the time the emergency communication session was established and associate the timer with the device identifier. The timer and the device identifier may, for example, be stored in the rating engine 120, or in a database and/or directory accessible to the rating engine 120. As will be described below, the timer is utilized by the system to determine whether a defined threshold of time (e.g., 10 minutes, 5 minutes, etc.) has elapsed since an emergency communication session was established between a device and the service provider.

At a time 166, the established communication session is prematurely disconnected or dropped. For example, if the communication is a 911 call, the 911 call may disconnect. The device user may prematurely terminate the communication session, the service provider may prematurely terminate the communication session, or technical difficulties may terminate the communication session. In some embodiments, a notification of the premature termination of the communication session may be sent from the emergency service routing engine 125 to the rating engine 120. In response to receiving the notification of premature termination, the rating engine may restart the timer associated with the device in order to allow the system to measure whether a defined threshold of time (e.g., 10 minutes, 5 minutes, etc.) has lapsed since the emergency communication session was terminated.

Subsequent to the termination of the communication session, the same service provider (e.g., the PSAP) or a different service provider may desire to reestablish the communication session with the device user. In order to do so, at a time 170 the service provider 130 sends a request to reestablish the communication session to the switch 110. The request may include the device identifier (e.g., MSISDN, MSI, MAC address, IP address, etc.).

At a time 173, the switch 110 sends a "rating request" or a request to authorize establishment of the communication session to the routing engine 115. At a time 176, the routing engine 115 forwards the request to reestablish a communication session to the rating engine 120. The request may, for example, include the device identifier. The rating engine accesses the database and/or directory storing the timer and associated device identifier. The rating engine 120 identifies the timer associated with the device identifier and determines whether the defined threshold of time has lapsed. As mentioned above, in some embodiments the timer indicates the amount of time since the emergency communication session was initially established, while in other embodiments the timer indicates the amount of time since the emergency communication session was terminated. If the defined threshold period has not lapsed, the rating engine 120 authorizes the request to reestablish the communication session by forwarding a permission message to the switch 110 at a time 180. Otherwise, the communication session is denied by the rating engine.

In some embodiments, the device 105 may belong to a family allowance plan (e.g., Family Allowances$^{SM}$). In such an event, the rating engine 120 may deduct minutes and/or usage units from the overall service plan for the duration of the communication sessions, if minutes and/or usage units remain in the plan. Alternatively, if the resources allocated under the plan are exhausted or if the device 105 does not belong to a family allowance plan, the rating engine 120 may track the amount of minutes and/or usage units consumed during the reestablished communication session, and impose a subsequent fee on the device user. In other embodiments, the communication session may be free of charge (similar to outgoing 911 calls, customer service calls, etc.).

The routing engine 115 may also communicate with peripherals, e.g., to play voice messages, or prompt for information, such as pre-paid minute purchases using account codes.

At a time 183, the emergency communication session is reestablished between the device 105 and the same or a different service provider 130. In the event that there is another termination in the communication session, the communication session may be reestablished by repeating the signaling occurring at times 170-183. The rating engine may re-set the timer associated with the device at the time the connection is reestablished, or at the time that the connection is lost. In this manner, communication sessions may be enabled over an extended period having multiple disconnections.

Figure 2:
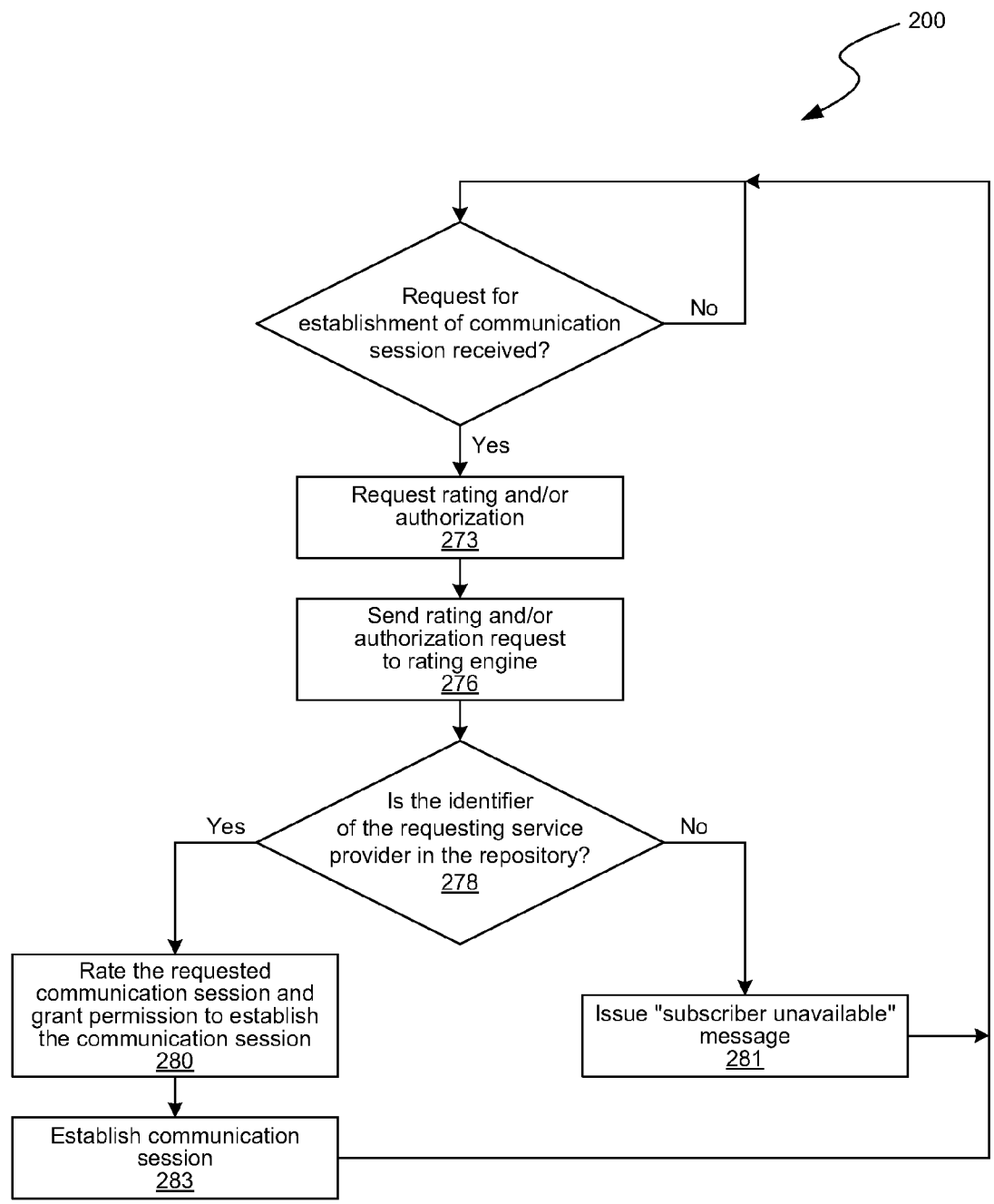
FIG. 2 is a flowchart illustrating allowing callbacks from a service provider based on a stored list of service provider numbers.

FIG. 2 is a flow chart illustrating an alternate method 200 for establishing a communication session between a disabled device 105 and a service provider 130 (e.g., a PSAP such as a 9-1-1 call center or customer service for a telecommunications service provider). The alternate method depends on a list of "authorized" service providers that are maintained by the system in a database that is accessed by the rating engine 120. At a decision block 270, the service provider 130 requests the establishment of a communication session with the device 105. The request may be in response to a prematurely terminated communication session (e.g., a disconnected communication session or dropped call) or, alternatively, may be a first request for communication with the device 105.

At a block 273, in response to the communication request, the switch (e.g., a Mobile Switching Center or MSC) 110 requests a rating and/or authorization from the routing engine 115. At a block 276, the routing engine 115 sends the rating request and/or authorization request to the rating engine 120. The rating engine determines whether the requesting service provider is contained in a database or repository of authorized service providers that are identified by one or more identifiers (e.g. telephone numbers, numeric and/or alphanumeric addresses identifiers, uniform resource identifiers (URI), or other identification information). It will be appreciated by those skilled in the art that the identity of the service providers may be stored in any number of available ways.

At a decision block 278, the rating engine 120 compares the identifier of the requesting service provider 130 with the list of authorized service providers that are located in the repository. Using one or more comparison methods known in the art, the rating engine 120 determines whether the request service provider is found in the repository. At a block 281, if the requesting service provider 130 does not match one of the identifiers in the repository, the service provider 130 may receive a "subscriber unavailable" message. The attempt to connect with the disabled device may be repeated until the service provider 130 discontinues its communication request (e.g., the PSAP operator hangs up), or the system terminates the service provider's 130 communication request (e.g., the system hangs up on the PSAP operator) after a number of failed communication attempts.

Alternatively, if the requesting service provider identifier is found in the repository of authorized service providers then at a block 280 the rating engine 120 rates the requested communication session and grants permission to establish the communication session. At a block 283, the communication session between the service provider 130 and the device 105 is established. The method 200 passes control back to decision block 270, and waits for another communication request from the service provider 130.

As mentioned above, in some embodiments, the device 105 may belong to a family allowance plan (e.g., Family Allowances$^{SM}$). In such an event, the rating engine 120 may deduct minutes and/or usage units from the overall service plan for the duration of the communication sessions, if minutes and/or usage units remain in the plan. Alternatively, if the service plan resources are exhausted or if the device 105 does not belong to a family allowance plan, the rating engine 120 may track the amount of minutes and/or usage units consumed during the reestablished communication session, and impose a subsequent fee on the device user. In other embodiments, the communication session may be free of charge (similar to outgoing 911 calls, customer service calls, etc.).

It should be appreciated that the method described in FIG. 2 could be used in conjunction with the method described in FIG. 1. For example, in one embodiment, a communication session (e.g., call) may be rated as "free" if the identifier of the service provider 130 (e.g., an incoming telephone number) is found in the list of authorized service providers as disclosed in FIG. 2, and/or if there is an active timer and the timer indicates that the defined threshold period has not lapsed, as disclosed in FIG. 1.

Figure 3:
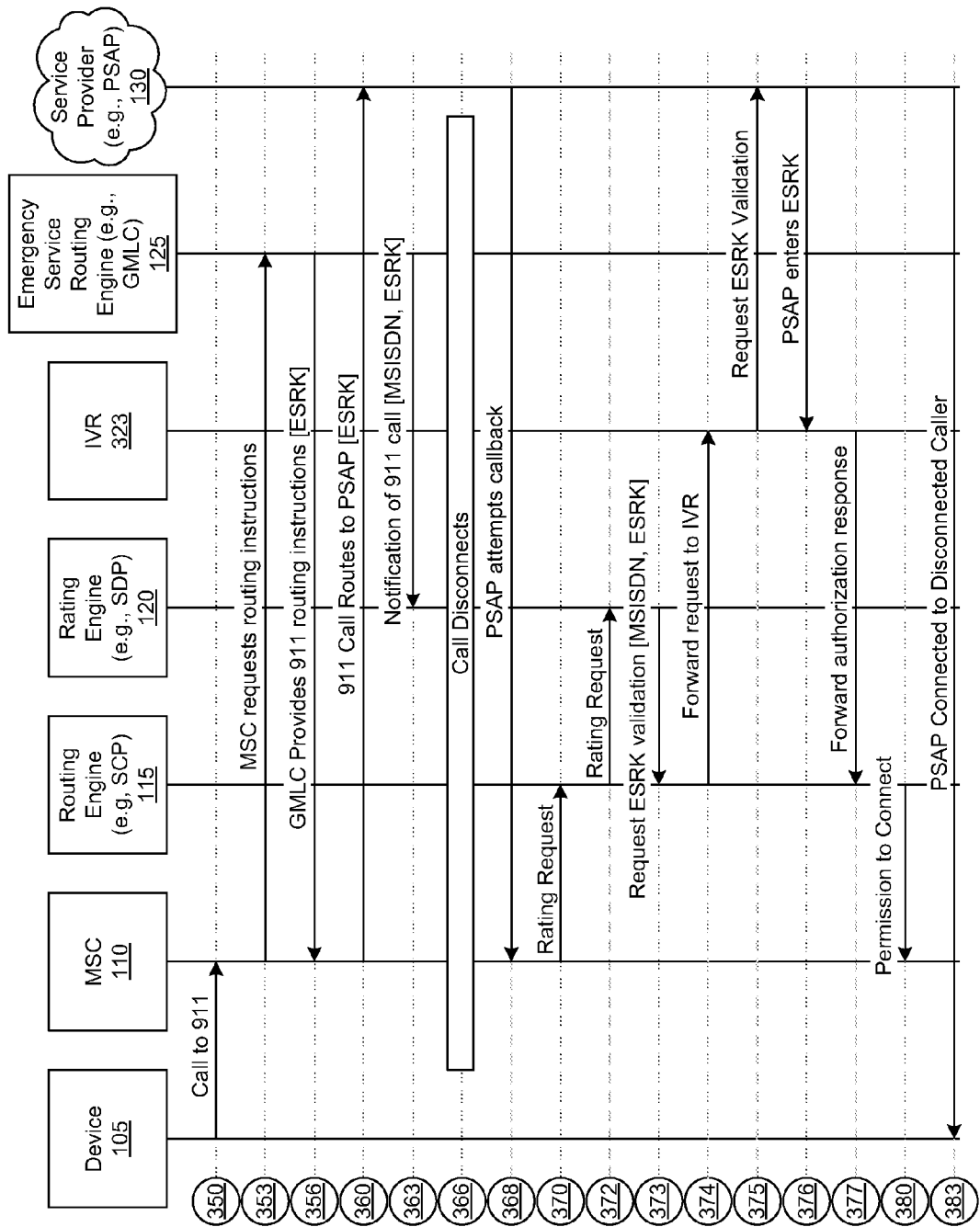
FIG. 3 is a signaling diagram that depicts allowing callbacks to a disabled device based on an associated routing key.

FIG. 3 is a signaling diagram illustrating a series of messages that are sent between the disabled device 105, the switch 110, the routing engine 115, the rating engine 120, an Interactive Voice Response (IVR) system 323, the emergency service routing engine 125 (e.g., a Gateway Mobile Location Center or GMLC) and the service provider 130, in order to establish an emergency communication between the disabled device 105 and the service provider 130, and to reestablish communication between the same or a different service provider and the disabled device 105 if the emergency communication between the disabled device and the service provider is interrupted or otherwise terminated. The method depicted in FIG. 3 uses a routing key (e.g., a pANI) to establish and reestablish communication between a service provider and the disabled device.

At a time 350, the disabled device 105 user attempts to initiate an emergency communication session with the service provider 130, such as by placing a call to 911. At a time 353, the switch 110 requests a routing key unique to the communication session, such as a pANI (e.g., an ESRK or ESQK), from the emergency service routing engine 125. At a time 356, the emergency service routing engine 125 sends to the switch 110 the routing key which contains sufficient information to route the disabled device to the appropriate service provider 130. At a time 360, the switch 110 routes the communication request to the service provider 130. The communication session is thereby established between the disabled device and the service provider. Additional information such as a device identifier (e.g., MSISDN, IMSI, MAC address, IP address) and any location information known about the device 105, may also be provided to the service provider. The pANI is a temporary routing key associated with the specific device it was generated for, and may or may not be known by the device user. At a time 363, the emergency service routing engine 125 provides the rating engine 120 with the routing key, an identifier (i.e., the MSISDN, MSI, MAC address, IP address, or telephone number) associated with device, and/or the time of establishment of the communication session. The routing key, device identifier, and/or time the communication session was established are stored by the rating engine. In some embodiments, additional numbers of comparable routing engines and routing identifiers may also be provided to the rating engine.

At a time 366, the established communication session between the disabled device and the service provider is prematurely disconnected or dropped due to any number of reasons. For example, the device user may prematurely terminate the communication session, the service provider may prematurely terminate the communication session, or technical difficulties may terminate the communication session. At a time 368, the same or a different service provider attempts to reestablish the communication session with the device 105 user. The service provider 130 therefore sends a request for reestablishing the communication session to the switch 110.

At a time 370, the switch 110 sends a rating request or a request to authorize reestablishment of the communication session to the routing engine 115. The authorization request may, for example, include the device 105 identifier. At a time 372, the routing engine 115 forwards the rating request to the rating engine 120. Although the rating engine 120 determines that the device 105 is currently disabled, the rating engine allows the communication session to be reestablished since the session relates to a previous emergency communication session.

At a time 373, the rating engine 120 informs the routing engine 115 that a routing key, e.g., pANI, authentication request should be made. The routing engine 115 is configured to interface with the Interactive Voice Response (IVR) system 323 or other peripheral components. At a time 374, the routing engine 115 forwards the authentication request to the IVR 323 and/or to the other peripheral components.

The IVR is responsible for accepting and prompting an operator for input that is used to authenticate the service provider and therefore allow the session to be reestablished. Operator input to authenticate the request may come from touch-tone keys and interpreted with tone-recognition software, or may come from spoken words and interpreted with voice-recognition software. At a time 375, the IVR 323 prompts an operator at the service provider 130 to enter the routing key, e.g., the pANI, that was sent to the service provider when the device initiated the emergency communication session with the service provider. The IVR prompt may be a single node in a menu tree, or may be part of a larger menu tree (e.g. "press 1 for English . . . press 3 if you are a PSAP . . . please enter the key"). The operator at the service provider 130 may enter the routing key, recite the routing key, or enter the routing key in any other variety of ways. For example, the operator may be provided with a software user interface that allows the operator to issue an authentication command. In such an interface, the operator may or may not be made aware of the actual alpha- or alpha-numeric construction of the routing key.

At a time 376, the operator at the service provider 130 enters the routing key (e.g., the pANI). At a time 377, the IVR 323 forwards the entered routing key response to the routing engine 115. The routing engine 115 compares the entered routing key with the routing key associated with the particular device 105. At a time 380, if there is a match between the entered routing key and the stored routing key, the routing engine 115 grants permission to reestablish the communication session via the switch 110. At a time 383, the communication session is therefore reestablished between the disabled device and the service provider. If the entered routing key does not match the stored routing key, the system may provide a failure notice, may provide a certain number of reentry tries, or may perform any number of other actions before the system finally disallows the attempted connection.

The routing key may be any number and combination of digits (e.g., numeric, alphanumeric, or any combination thereof) to allow a service provider (e.g., PSAP) to connect to a user device (e.g., telephone device such as a wireless landline or mobile phone). The routing key may be automatically, dynamically, or manually generated.

The embodiments described in FIGS. 1, 2 and 3 may be used in combination with and without each other. For example, a communication session may be allowed (or "rated as free") if the service provider identifier is found in the repository of known service providers and the service provider operator is able to authenticate the communication using the routing key. In another example, a communication session may be allowed (or "rated as free") if the timer indicates that the defined threshold period has not lapsed, the service provider identifier is contained in the repository of known service providers, and the service provider operator is able to authenticate the communication using the routing key. Different combinations of the disclosed embodiments could be used to create a permissive callback system to balance the competing concerns of user safety and system abuse.

Figure 4:
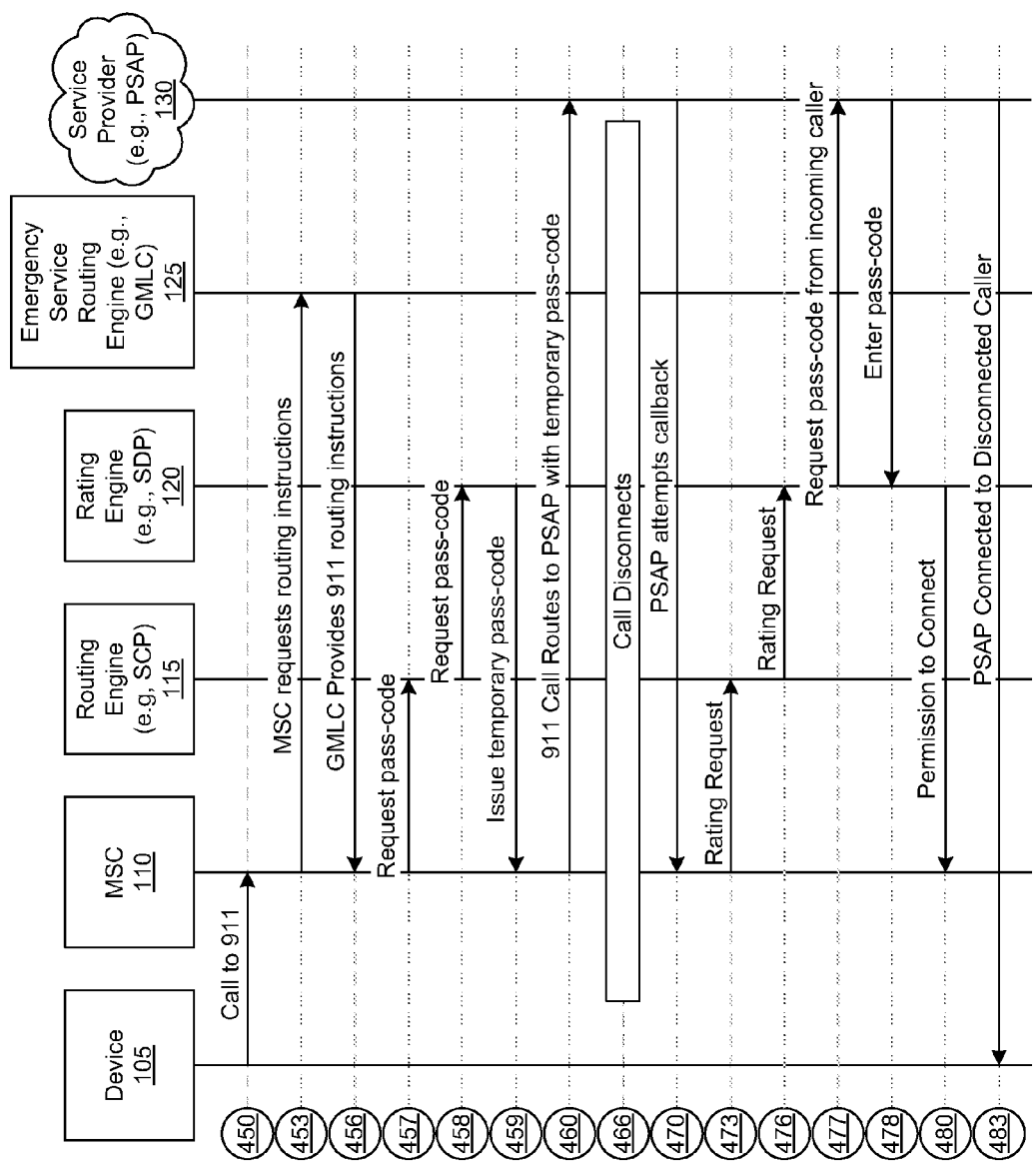
FIGS. 4 and 5 are signaling diagrams that depicts allowing callbacks to a disabled device based on an issued passcode.
Figure 5:
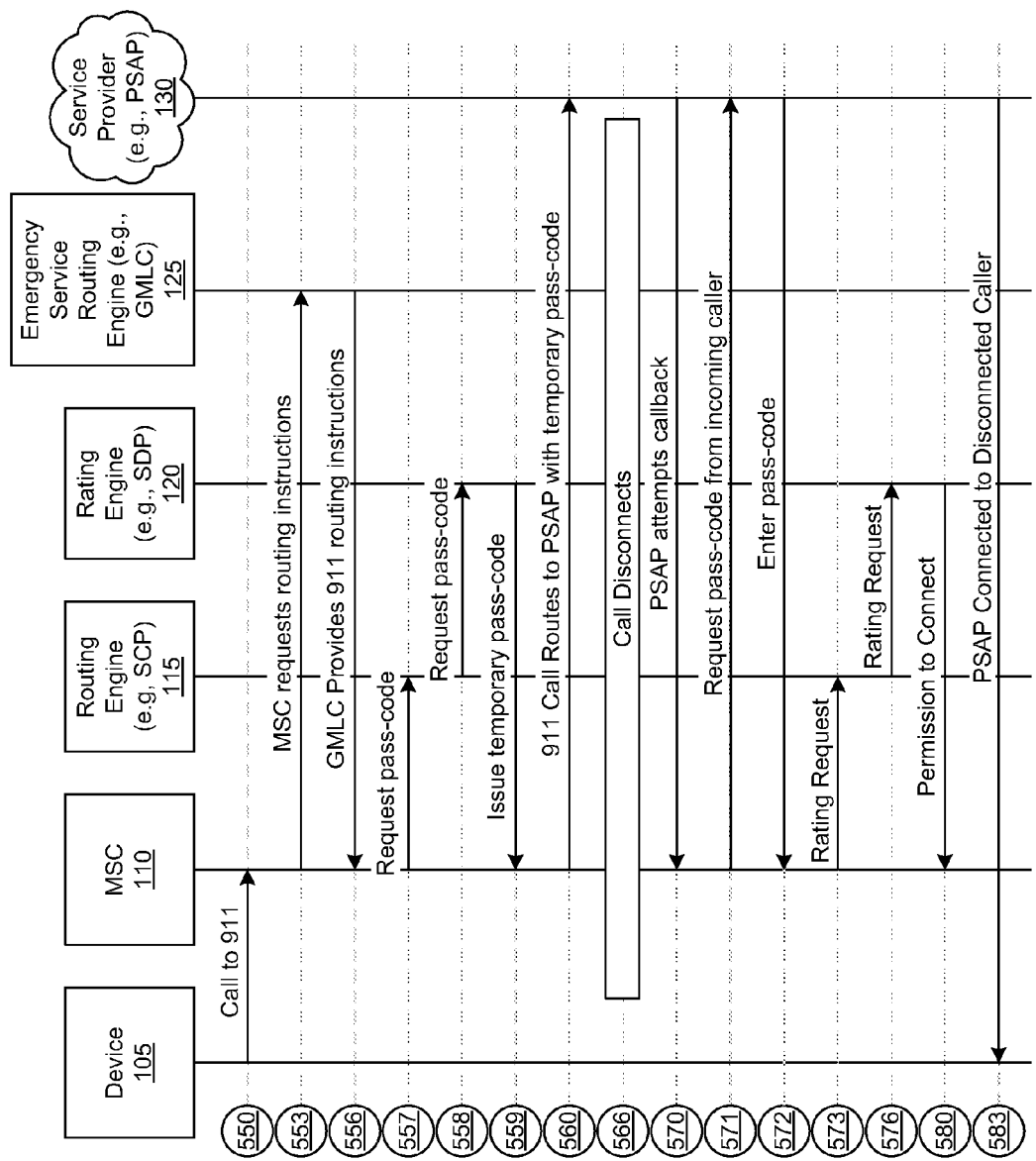

FIGS. 4 and 5 are signaling diagrams illustrating a series of messages that are sent between the disabled device 105, the switch 110, the routing engine 115, the rating engine 120, the emergency service routing engine 125, and the service provider 130, in order to establish an emergency communication between the disabled device 105 and the service provider 130, and to reestablish communication between the same or a different service provider and the disabled device 105 if the emergency communication between the disabled device and the service provider is interrupted or otherwise terminated. The methods depicted in FIGS. 4 and 5 use passcodes to establish and reestablish communication between the service provider and the disabled device.

With respect to FIG. 4, at a time 450, the disabled device 105 user attempts to initiate an emergency communication session with the service provider 130, such as by placing a call to 911. At a time 453, the switch 110 requests a routing key unique to the communication session, such as a pANI (e.g., an ESRK or ESQK), from the emergency service routing engine 125. At a time 456, the emergency service routing engine 125 provides the switch 110 with the routing instructions. At times 457-458, the switch 110 requests, via the routing engine 115, that the rating engine 120 generate a passcode to associate with the device 105. At a time 459, a temporary passcode is issued to the switch 110 by the rating engine. The passcode may be any unique code, such as a string of alphanumeric characters. At a time 460, the switch routes the communication request to the service provider 130 along with the passcode, thereby establishing an emergency communication session between the device 105 and the service provider 130.

At a time 466, the emergency communication session is disconnected and, at a time 470, the same or a different service provider attempts to reestablish the communication session with the device 105. At a time 473, the switch 110 sends a "rating request" or a request to authorize reestablishment of the communication session to the routing engine 115 and, at a time 476, the routing engine 115 forwards the request to the rating engine 120. The rating engine 120 receives the rating request, and, at a time 477, prompts the service provider 130 for the passcode. At a time 478, the service provider enters and transmits the passcode to the rating engine. The passcode may be automatically entered by service provider systems, or manually entered by a system provider operator (e.g., using an IVR system as described with respect to FIG. 3). Depending on the systems provided at the service provider, the operator may or may not be made aware of the alpha- or alphanumeric construction of the passcode. At a time 480, the rating engine compares the entered passcode with the previously-stored passcode. If the entered passcode matches the stored passcode, the rating engine 120 grants permission to reestablish the communication session (e.g., to connect the call such as by rating the call as free). At a time 483, the service provider 130 reestablishes the disconnected communication session with the device 105.

Turning to FIG. 5, the messages sent at times 550-570 are substantially similar to the messages sent at times 450-470 in FIG. 4. In the method shown in FIG. 5, however, upon receiving an attempt to reestablish the communication session from the service provider 130, the switch 110 prompts the service provider 130 for a passcode at a time 571. At a time 572, the service provider enters and transmits the passcode to the switch. The passcode may be automatically entered by service provider systems, or manually entered by a system provider operator (e.g., using an IVR system as described with respect to FIG. 3). At a time 572 the switch transmits the received passcode to the rating engine, where the rating engine compares the entered passcode with the previously-stored passcode. If the entered passcode matches the stored passcode, the rating engine 120 grants permission to reestablish the communication session (e.g., to connect the call such as by rating the call as free) at a time 580. At a time 583, the service provider 130 reestablishes the disconnected communication session with the device 105. If the entered passcode does not match the stored passcode, the method may allow for any number of reentry tries before issuance of a failure message and disallowing the reestablishment of the communication session.

Figure 6:
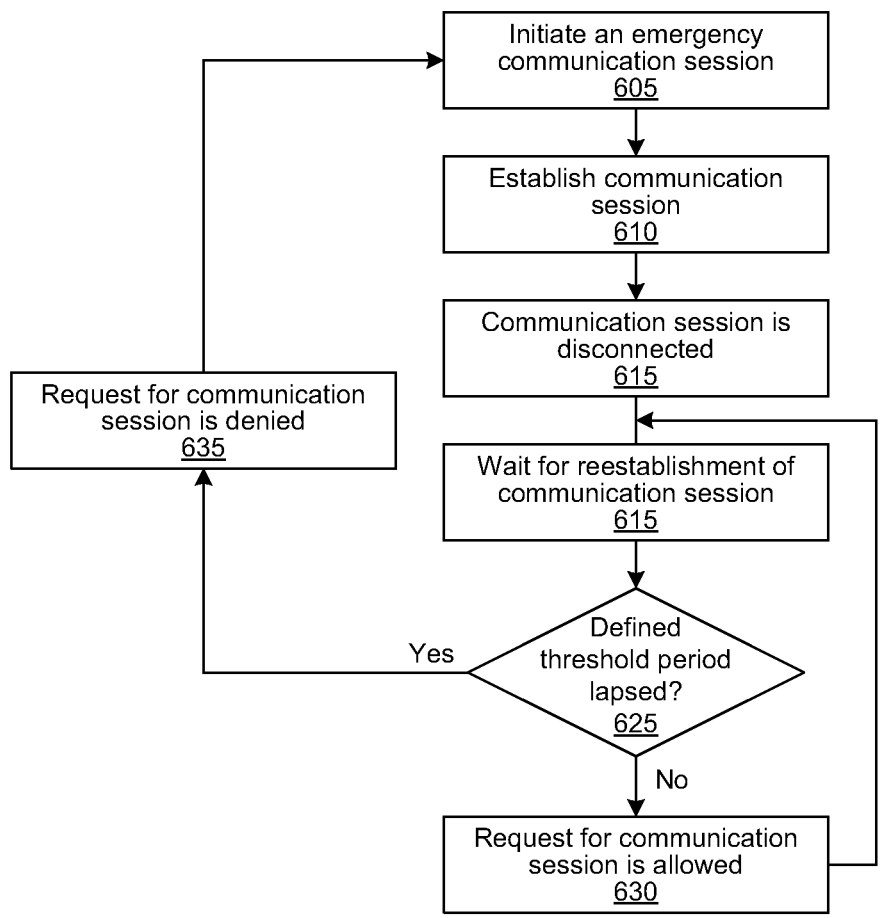
FIG. 6 is a flowchart illustrating allowing callbacks from a service provider that occur within a threshold time after an emergency call.

FIG. 6 is a partial flowchart of the method depicted in FIG. 1 for reestablishing a communication session with the disabled device 105 after an emergency communication session has been terminated. At block 605, the device user initiates an emergency communication request. At block 610, the network routes the communication request (e.g., call) to the service provider 130 and establishes the emergency communication session. At block 615, the communication session is disconnected for any one of the previously-articulated reasons. In response thereto, a configurable timer or other mechanism for measuring elapsed time is initiated by the system. At block 620, the rating engine 120 receives a request to reestablish the communication session. When a request to reestablish the communication session is received, at a decision block 625 the rating engine checks the state of the timer or the mechanism for monitoring elapsed time. If a threshold period has lapsed (i.e., if the elapsed time is greater than a threshold time), at block 635 the rating engine denies the request for the communication session. If a threshold period has not lapsed (i.e., the elapsed time is less than a threshold time), at block 630 the rating engine allows the request for the communication session, such as by rating it as free of charge. The method passes control back to block 620 and where the rating engine waits for another request to reestablish the communication session. The threshold period may be set by the system operator and may be minutes, tens of minutes, or other time suitable to enable communication sessions to be reestablished. Those skilled in the art will appreciate that whether the threshold period has elapsed may be determined by setting a countdown timer and detecting whether the timer has reached zero, by starting a count-up timer and detecting whether the elapsed time has exceeded the threshold period, by storing a first time when the communication session is either initiated or terminated and comparing the first time with a second time when a request is received for reestablishing a communication session, or by any other means. Moreover, even though the measurement of elapsed time is depicted as starting in block 615, the measurement may begin at any other point associated with the communication session.

Figure 7:
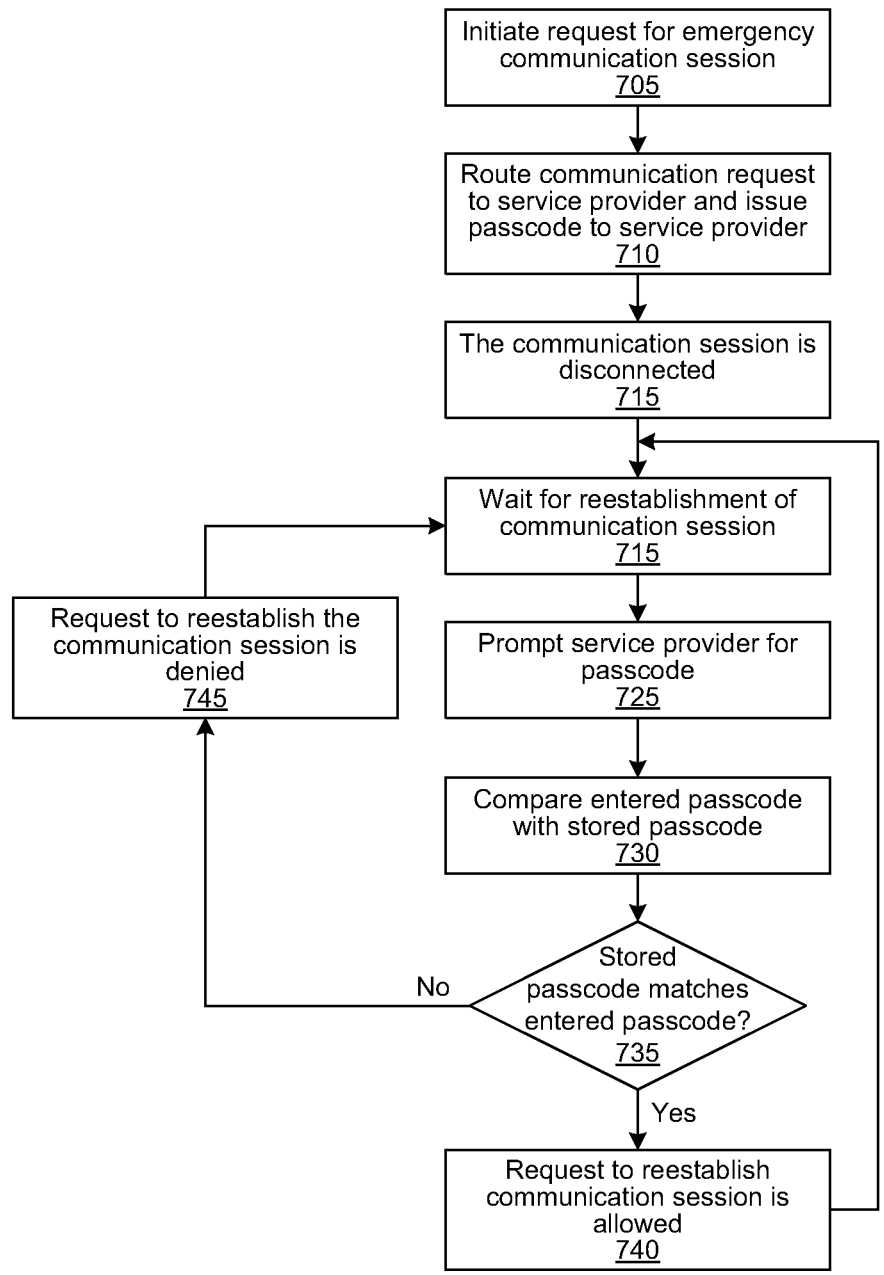
FIG. 7 is a flowchart illustrating allowing callbacks from a service provider based on an issued passcode.

FIG. 7 is a partial flowchart of the methods depicted in FIGS. 4 and 5. At a block 705, a user of a device 105 initiates a request for an emergency communication session. At block 710, the system routes the communication request to the service provider 130 and issues a passcode to the service provider 130. The passcode may be any unique code, such as a string of alphanumeric characters. At block 715, the communication session (e.g., the call) is disconnected for any one of the previously-articulated reasons. At block 720, the system receives a request to reestablish the communication session. At block 725, in response to the request to reestablish the communication session, the service provider is prompted for the passcode. At block 730, the system receives the passcode and compares the entered passcode with the stored passcode associated with the previous emergency communication session initiated by the device 105. At decision block 735, the system determines whether the stored passcode matches the entered passcode. If the stored passcode matches the entered passcode, the system allows the request to reestablish the communication session (e.g., call) at block 740. The method passes control to block 720 and waits for another request for a communication session. If the stored passcode does not match the entered passcode, the system denies the request to reestablish the communication session at block 745. The system may allow a number of attempted re-connection attempts before issuing a failure message.

Those skilled in the art will appreciate that the system and methods disclosed herein may be implemented on any computing system or device. Suitable computing systems or devices include server computers, multiprocessor systems, microprocessor-based systems, network devices, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium for storing data. Software may include one or more program modules which include routines, programs, objects, components, data structures, and so on that perform particular tasks or implement particular abstract data types. The functionality of the program modules may be combined or distributed as desired in various embodiments.

It should be appreciated that the embodiments disclosed above are only examples of the present invention. The described embodiments may be used in various combinations with and without each other. Additional implementations will be apparent to persons of ordinary skill in the art having the benefit of this disclosure. For example, the presented embodiments refer to rating a call as free to allow an incoming emergency call despite an insufficient amount of pre-paid minutes. However, in some embodiments the issue may not be a lack of minutes, but rather a suspended account, a locked device, or a deactivated account because the device was reported as lost or stolen. In some embodiments, "rating the call as free" is sufficient to enable the communication session to be reestablished. In some embodiments, rather than "rating the call as free" the rating engine or other system component may implement a functional equivalent that allows the device to receive an incoming call despite the device otherwise being unable to receive the communication. For example, if the device (e.g., phone) is locked and the device user does not know or cannot remember the unlock code, a call to the service provider (e.g., 911 call) is typically still allowed. In a callback situation, instead of or in addition to "rating the call as free," the system may remotely and temporarily unlock the device so the user may answer the incoming call.

From the foregoing, it will be appreciated that specific embodiments of the invention have been described herein for purposes of illustration, but that various modifications may be made without deviating from the spirit and scope of the invention. For example, while signaling or blocks are presented in a given order, alternative implementations may perform routines having signaling or blocks in a different order, and some signaling or blocks may be deleted, moved, added, subdivided, combined, and/or modified to provide alternative or subcombinations. Each of these signaling or blocks may be implemented in a variety of different ways. Also, while signaling or blocks are at times shown as being performed in series, the signaling or blocks may instead be performed or implemented in parallel, or may be performed at different times. Accordingly, the invention is not limited except as by the appended claims.

We claim:

1. A computer-readable medium, excluding transitory signals, and carrying instructions, which when executed by at least one data processor, perform a method for establishing a communication session between a disabled telecommunications device and a destination after a communication session between the disabled telecommunications device and a service provider has ended, the method comprising:
   detecting an establishment of a communication session between a disabled telecommunications device and a service provider, the communication session being initiated by the disabled telecommunications device;
   receiving a request from a destination to establish a second communication session between the destination and the disabled telecommunications device,
      wherein the request to establish the second communication session occurs after the communication session between the service provider and the disabled telecommunications device has ended;
   determining whether an identifier corresponding to the destination belongs to a group of one or more authorized service providers;
   in response to determining that the identifier belongs to a group of one or more authorized service providers, authorizing the establishment of the second communication session; and
   in response to determining that the identifier does not belong to a group of one or more authorized service providers, denying the establishment of the second communication session.

2. The computer-readable medium of claim 1, further comprising determining an elapsed time between the communication session and the request to establish the second communication session, wherein the elapsed time is measured from the end of the emergency communication session, and wherein the end of the emergency communication session is a result of at least one of: the disabled telecommunications device terminating the communication session, the service provider terminating the communication session, or network difficulties terminating the communication session.

3. The computer-readable medium of claim 1, further comprising determining an elapsed time between the communication session and the request to establish the second communication session, and wherein the elapsed time is measured from the start of the communication session.

4. The computer-readable medium of claim 1, further comprising determining an elapsed time between the communication session and the request to establish the second communication session, and wherein the elapsed time is measured from the end of the emergency communication session.

5. The computer-readable medium of claim 1, wherein the communication session is a voice, video, Instant Messaging (IM), Short Message Service (SMS), or multimedia session.

6. The computer-readable medium of claim 1, wherein the second communication session is a voice, video, Instant Messaging (IM), Short Message Service (SMS), or multimedia session.

7. The computer-readable medium of claim 1, further comprising determining an elapsed time between the communication session and the request to establish the second communication session, and wherein the elapsed time is determined by a timer.

8. The computer-readable medium of claim 1, further comprising determining an elapsed time between the communication session and the request to establish the second communication session, and wherein the elapsed time is determined by comparing a time stamp associated with the communication session and a time of the request to establish a second communication session.

9. The computer-readable medium of claim 1, wherein authorizing the establishment of the second communication session includes enabling charging for communication resources consumed during the second communication session.

10. The computer-readable medium of claim 1, wherein the communication session is an emergency communication session, including a 911 call and the service provider is a Public Safety Answering Point (PSAP).

11. The computer-readable medium of claim 1, wherein the method involves an emergency responder and the service provider being the same parties.

12. A method for establishing a communication session between a disabled telecommunications device and a destination after a communication session between the disabled telecommunications device and a service provider has terminated, the method comprising:
   detecting an establishment of a communication session between a disabled telecommunications device and a service provider,
      wherein the communication session was previously initiated by the disabled telecommunications device;
   receiving a request from a destination to establish a second communication session between the destination and the disabled telecommunications device,
      wherein the request to establish the second communication session occurs after the communication session between the service provider and the disabled telecommunications device has terminated;
   determining whether an identifier corresponding to the destination belongs to a group of one or more authorized service providers;
   in response to determining that the identifier belongs to a group of one or more authorized service providers, authorizing the establishment of the second communication session; and
   in response to determining that the identifier does not belong to a group of one or more authorized service providers, denying the establishment of the second communication session.

13. The method of claim 12, further comprising determining an elapsed time between the communication session and the request to establish the second communication session, and wherein the elapsed time is measured from the start of the communication session.

14. The method of claim 12, further comprising determining an elapsed time between the communication session and the request to establish the second communication session, and wherein the elapsed time is measured from the end of the emergency communication session.

15. The method of claim 12, wherein the communication session is a voice, video, Instant Messaging (IM), Short Message Service (SMS), or multimedia session.

16. The method of claim 12, wherein the second communication session is a voice, video, Instant Messaging (IM), Short Message Service (SMS), or multimedia session.

17. The method of claim 12, further comprising determining an elapsed time between the communication session and the request to establish the second communication session, and wherein the elapsed time is determined by a timer.

18. The method of claim 12, further comprising determining an elapsed time between the communication session and the request to establish the second communication session, and wherein the elapsed time is determined by comparing a time stamp associated with the communication session and a time of the request to establish a second communication session.

19. A system for establishing a communication session in a network between a disabled telecommunications device and a destination after a communication session between the disabled telecommunications device and a service provider has terminated, comprising:
    at least one processor coupled to the network;
    at least one memory, coupled to the at least one processor, and storing instructions to be performed by the at least one processor to:
        detect an establishment of a communication session between a disabled telecommunications device and a service provider,
            wherein the communication session was previously initiated by the disabled telecommunications device;
        receive a request from a destination to establish a second communication session between the destination and the disabled telecommunications device,
            wherein the request to establish the second communication session occurs after the communication session between the service provider and the disabled telecommunications device has terminated;
        determine whether an identifier corresponding to the destination belongs to a group of one or more authorized service providers;
        in response to determining that the identifier belongs to a group of one or more authorized service providers, authorize the establishment of the second communication session; and
        in response to determining that the identifier does not belong to a group of one or more authorized service providers, deny the establishment of the second communication session.

20. The system of claim 19, wherein the communication session is selected from the group consisting of a voice session, a video session, an Instant Messaging (IM) session, a Short Message Service (SMS) session, and a multimedia session, and wherein the second communication session is selected from the group comprising is selected from the group consisting of a voice session, a video session, an Instant Messaging (IM) session, a Short Message Service (SMS) session, and a multimedia session.

\* \* \* \* \*